US012638730B2

(12) United States Patent
Aoki et al.

(10) Patent No.: US 12,638,730 B2
(45) Date of Patent: May 26, 2026

(54) CAMERA HAVING A LIQUID CRYSTAL DISPLAY PANEL BETWEEN A LENS AND AN IMAGING DEVICE

(71) Applicant: Japan Display Inc., Tokyo (JP)

(72) Inventors: Yoshiro Aoki, Tokyo (JP); Hirondo Nakatogawa, Tokyo (JP); Hitoshi Tanaka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 105 days.

(21) Appl. No.: 18/631,540

(22) Filed: Apr. 10, 2024

(65) Prior Publication Data

US 2024/0337884 A1     Oct. 10, 2024

(30) Foreign Application Priority Data

Apr. 10, 2023     (JP) ................................. 2023-063635

(51) Int. Cl.
　*G02F 1/1345*　　(2006.01)
　*H04N 23/55*　　(2023.01)
　*H04N 23/80*　　(2023.01)

(52) U.S. Cl.
　CPC ......... *G02F 1/13454* (2013.01); *H04N 23/55* (2023.01); *H04N 23/80* (2023.01)

(58) Field of Classification Search
　CPC ..... G02F 1/13454; H04N 23/55; H04N 23/80
　See application file for complete search history.

(56) References Cited

U.S. PATENT DOCUMENTS

| | | | | |
|---|---|---|---|---|
| 10,678,099 B2 * | 6/2020 | He | .......................... | G02F 1/1335 |
| 10,831,046 B2 * | 11/2020 | Que | .................. | G02F 1/136286 |
| 11,099,439 B2 * | 8/2021 | Bustle | .................... | H05K 1/189 |
| 2017/0219895 A1 * | 8/2017 | Yu | ......................... | G09G 3/2092 |
| 2019/0260919 A1 * | 8/2019 | Kwak | .................. | G06F 1/1686 |
| 2021/0141252 A1 * | 5/2021 | Takimoto | ................ | G02F 1/137 |
| 2022/0368785 A1 * | 11/2022 | Aoki | ...................... | G03B 17/02 |
| 2023/0221601 A1 * | 7/2023 | Aoki | ......................... | G09F 9/35 |
| | | | | 349/2 |

FOREIGN PATENT DOCUMENTS

| | | | | |
|---|---|---|---|---|
| JP | 2020-003648 A | 1/2020 | | |
| WO | WO-2022059279 A1 * | 3/2022 | ............ | H04N 23/75 |

* cited by examiner

*Primary Examiner* — Padma Haliyur
(74) *Attorney, Agent, or Firm* — XSENSUS LLP

(57) ABSTRACT

According to one embodiment, a camera includes a lens, a liquid crystal display panel, an imaging device on which light is made incident through the lens and the liquid crystal display panel, a first driver configured to drive the imaging device to capture an image of an object, a camera substrate on which the imaging device and the first driver are arranged, and a second driver configured to drive the liquid crystal display panel to display a specific image. The liquid crystal display panel is between the lens and the imaging device.

6 Claims, 8 Drawing Sheets

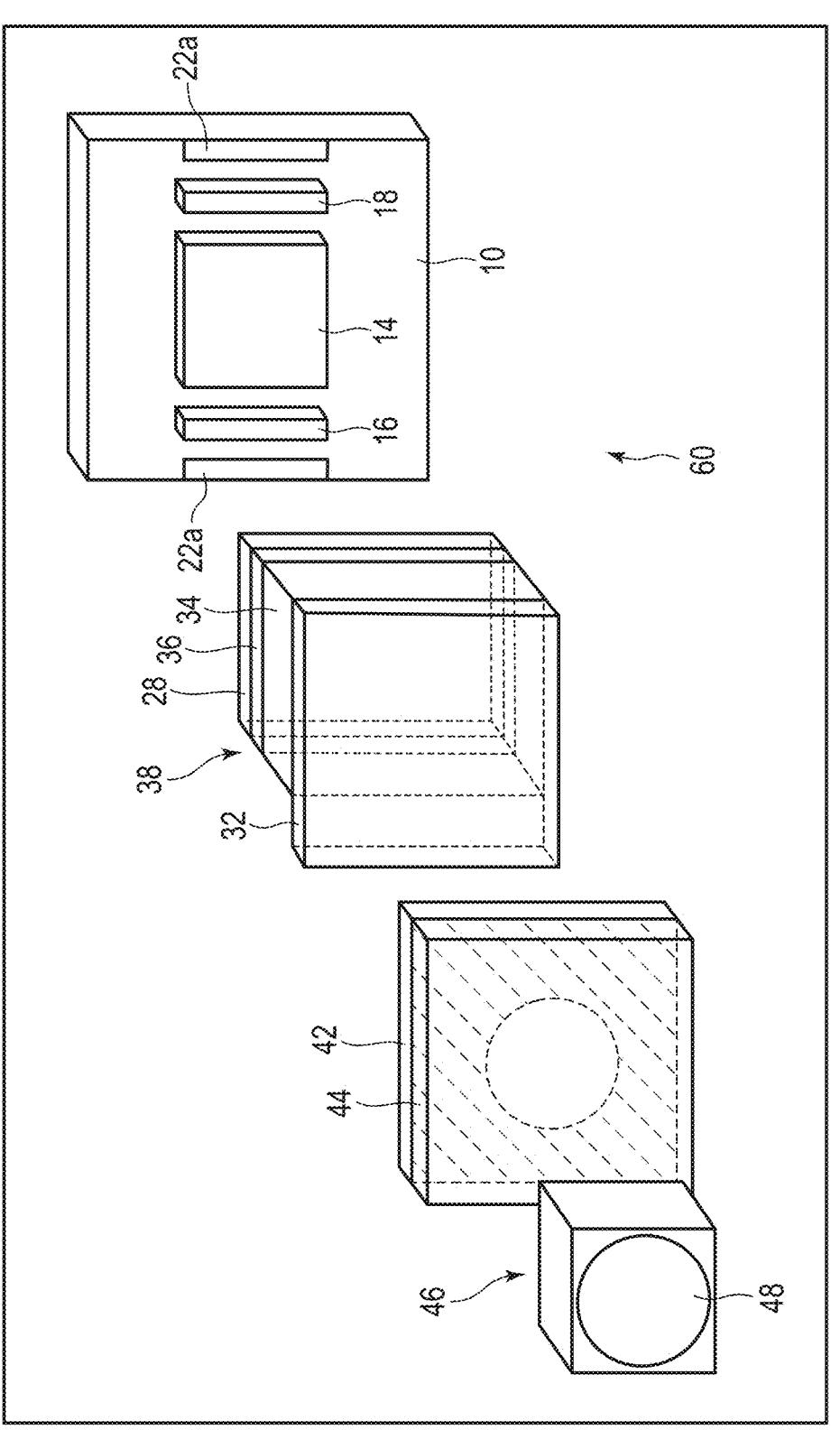
F I G. 2

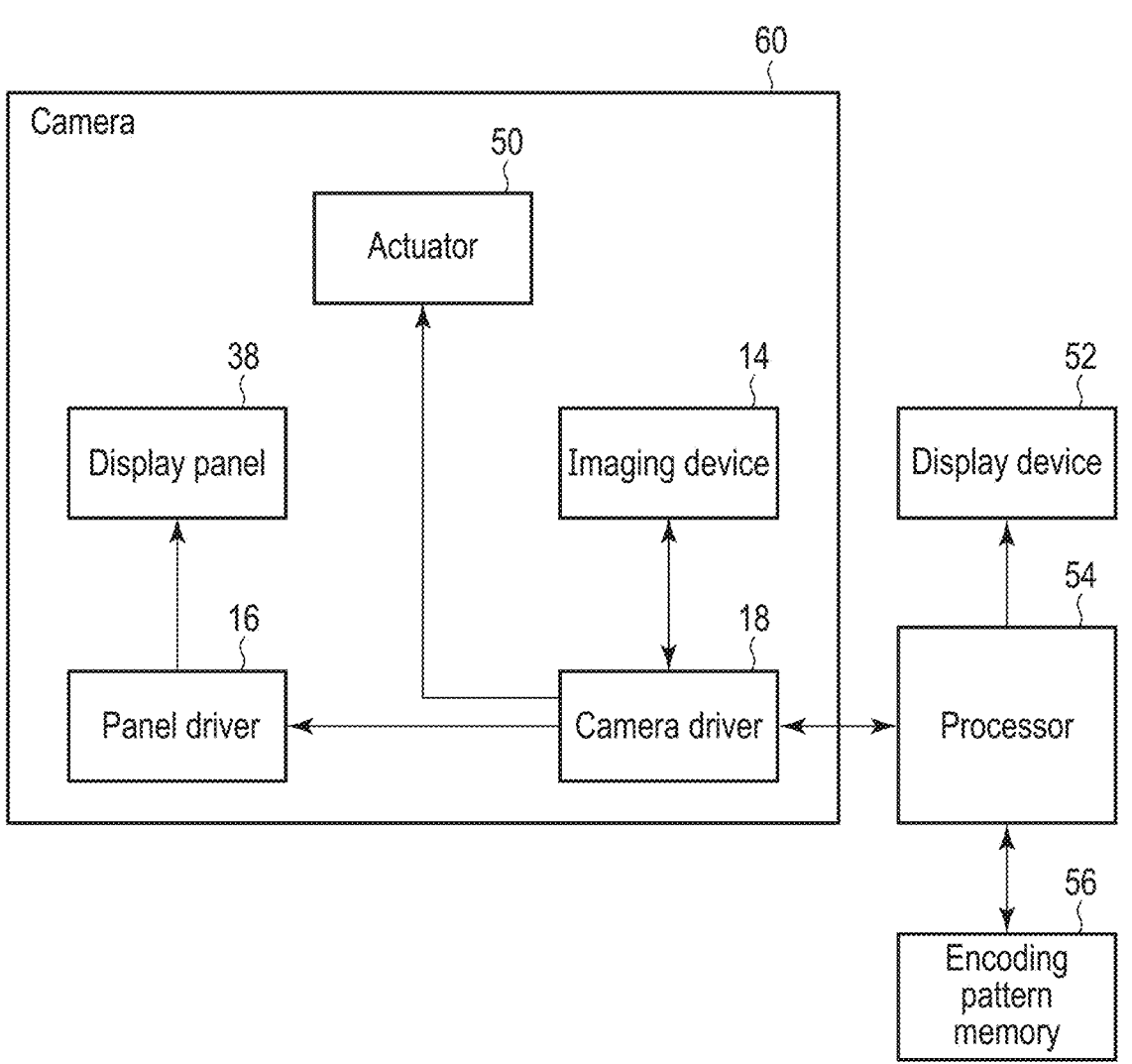
F I G. 3

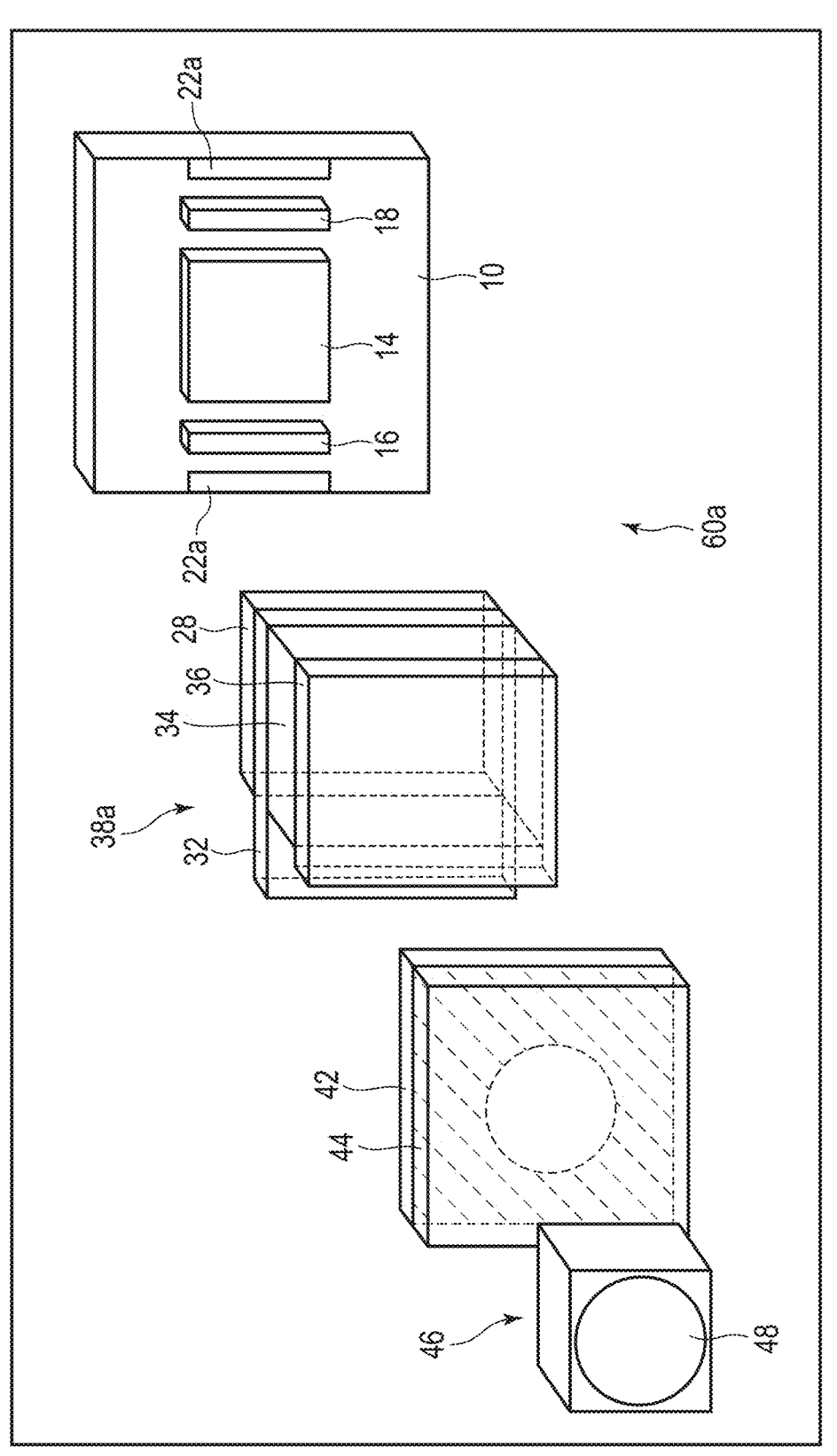
F I G. 6

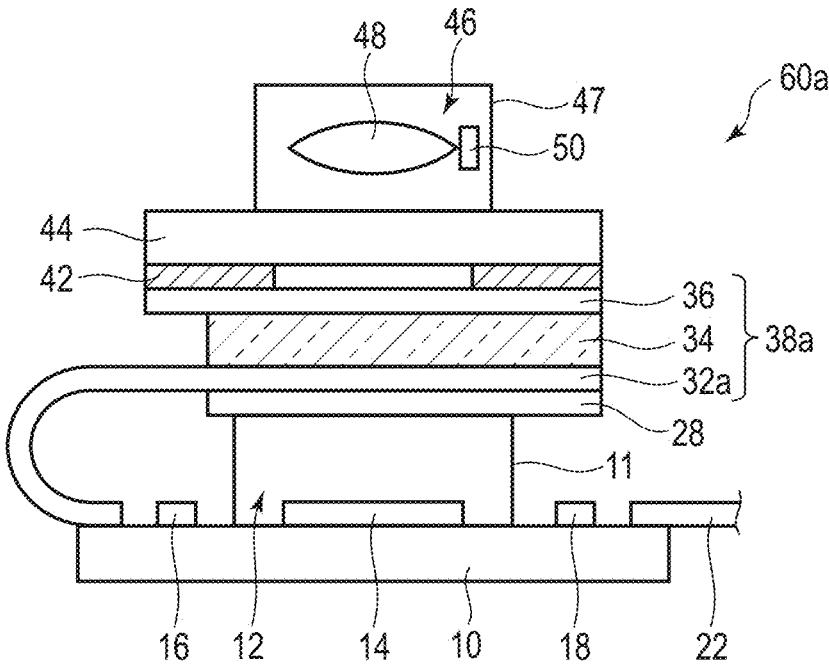
F I G. 11

CAMERA HAVING A LIQUID CRYSTAL DISPLAY PANEL BETWEEN A LENS AND AN IMAGING DEVICE

CROSS-REFERENCE TO RELATED APPLICATION

This application is based upon and claims the benefit of priority from Japanese Patent Application No. 2023-063635, filed Apr. 10, 2023, the entire contents of which are incorporated herein by reference.

FIELD

Embodiments described herein relate generally to a camera capturing images that can be used for distance measurement.

BACKGROUND

A technique for measuring the distance per pixel using image blur is known. A filter with a special pattern is attached to a camera lens. An object on which the special pattern overlaps is captured. If the object is out of focus, the image is blurred. The degree of blurring depends on the degree to which the object is shifted from a focusing state. When a special pattern overlaps, the blur shape in a case where the object is located in front of the focal position is different from that in a case where the object is located behind the focal position. For this reason, the distance to the object for each pixel can be measured based on the degree and shape of the blur for each pixel in the image. The special pattern is referred to as an encoding pattern.

The optimal shape of the encoding pattern depends on the captured object. To change the encoding pattern in accordance with changes in the captured object, the filter needs to be exchanged. Exchanging the filter is not easy. If the filter is not exchanged, it may not be possible to accurately measure the distance depending on the object.

BRIEF DESCRIPTION OF THE DRAWINGS

FIG. 2 is an exploded perspective view illustrating an example of the camera according to the first embodiment.

FIG. 3 is a block diagram illustrating an electrical configuration of a distance measurement system including the camera according to the first embodiment.

FIG. 6 is an exploded perspective view illustrating an example of the camera according to the second embodiment.

FIG. 11 is a cross-sectional view illustrating an example of a camera according to a seventh embodiment.

DETAILED DESCRIPTION

Figure 1A:
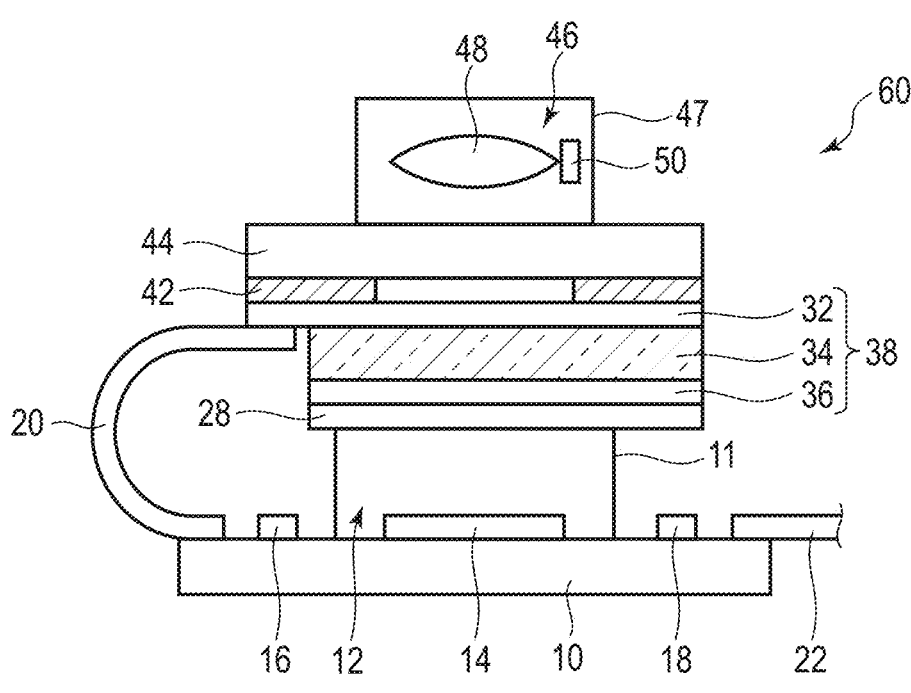
FIG. 1A is a cross-sectional view illustrating an example of a camera according to a first embodiment.

Embodiments will be described below with reference to the drawings. In the following descriptions, a device and a method are illustrated to embody the technical concept of the embodiments. The technical concept is not limited to the configuration, shape, arrangement, material or the like of the structural elements described below. Modifications that could easily be conceived by a person with ordinary skill in the art are naturally included in the scope of the disclosure. To make the descriptions clearer, the drawings may schematically show the size, thickness, planer dimension, shape, and the like of each element differently from those in the actual aspect. The drawings may include elements that differ in dimension and ratio. Elements corresponding to each other are denoted by the same reference numeral and their overlapping descriptions may be omitted. Some elements may be denoted by different names, and these names are merely an example. It should not be denied that one element is denoted by different names. Note that "connection" means that one element is connected to another element via still another element as well as that one element is directly connected to another element. If the number of elements is not specified as plural, the elements may be singular or plural.

In general, according to one embodiment, A camera includes a lens, a liquid crystal display panel, an imaging device, a first driver, a camera substrate, and a second driver. Light is made incident on the imaging device through the lens and the liquid crystal display panel. The first driver is configured to drive the imaging device to capture an image of an object. The imaging device and the first driver are on the camera substrate. The second driver is configured to drive the liquid crystal display panel to display a specific image. The liquid crystal display panel is between the lens and the imaging device.

First Embodiment

Figure 1B:
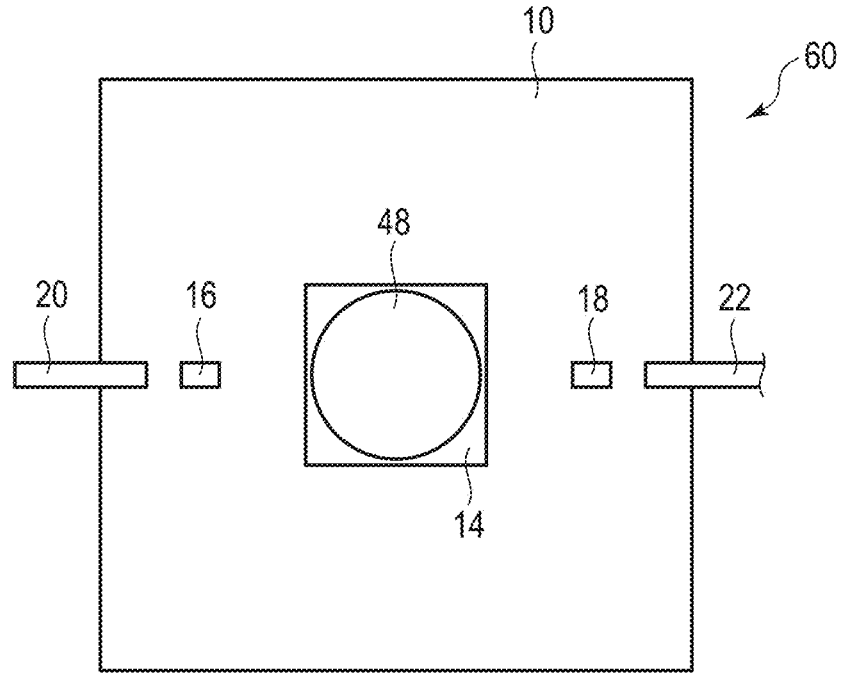
FIG. 1B is a plan view illustrating an example of the camera according to the first embodiment.

FIG. 1 and FIG. 2 are views illustrating an example of a camera 60 according to a first embodiment. FIG. 1A is a view illustrating an example of a structure of the camera 60 viewed from a side surface. FIG. 1B is a view illustrating an example of a structure of the camera 60 viewed from an upper surface.

The camera 60 includes a camera substrate 10. A position where the camera substrate 10 is located is referred to as a lower portion of the camera 60. A plurality of components of the camera 60 are arranged on the upper surface side of the camera substrate 10. The components are, for example, a camera module 12, a panel driver 16, and a camera driver 18. Although not shown in the drawing, other circuits such as resistors and inductances are also arranged on the camera substrate 10. The camera substrate 10 includes wires which electrically connects a plurality of components and circuits of the camera to each other.

The camera module 12 includes a housing 11 and an imaging device 14 arranged inside the housing 11. The imaging device 14 captures color images. Examples of the imaging device 14 are CCD sensors and CMOS sensors. In this specification, the side within both sides of the camera substrate 10 where the camera substrate 12 is arranged is referred to as an upper side of the camera substrate 10.

An IR filter 28, a display panel 38, a light shielding plate 42, a cover board 44, and a lens module 46 are arranged on the upper side of the camera module 12 in this order. The IR filter 28 is in close contact or substantially close contact with the camera module 12. An example of the display panel 38 is a liquid crystal display panel. The display panel 38 is in close contact or substantially close contact with the IR filter 28. The light shielding plate 42 is in close contact or substantially close contact with the display panel 38. The cover board 44 is in close contact or substantially close contact with the light shielding plate 42. The lens module 46 is in close contact or substantially close contact with the cover board 44.

One-side ends of flexible printed wiring films 20 and 22 are electrically connected to the camera substrate 10. The panel driver 16 is a driver. The panel driver 16 drives the display panel 38 to display specific images on the display panel 38. The panel driver 16 is an integrated circuit and is formed as an IC chip. The panel driver 16 supplies drive signals to the display panel 38 via the flexible printed wiring film 20. The drive signals include voltage signals and control signals.

The panel driver 16 can supply drive signals to the display panel 38 to display an encoding pattern on the display panel 38. The imaging device 14 captures an image of an object on which the encoding pattern overlaps. The distance to the object for each pixel can be measured from this image.

The camera 60 may be used not only as a camera capturing the images for distance measurement, but as a normal camera. In that case, the panel driver 16 supplies drive signals to the display panel 38 to display a diaphragm pattern on the display panel 38. The diaphragm pattern is a pattern with a central part that transmits light and a peripheral part that blocks light. A diameter of the central part is variable by the control signal. The diameter of the central part is determined by the brightness around the camera, which is measured by an optical sensor (not shown). The diameter of the central part is smaller when the surrounding of the camera is bright and larger when the surroundings are dark.

The camera driver 18 is a driver component. The camera driver 18 supplies drive signals to the imaging device 14 and causes the imaging device 14 to capture images. The camera driver 18 is an integrated circuit and is formed as an IC chip. The camera driver 18 supplies drive signals to the panel driver 16 via the camera substrate 10. The camera driver 18 controls the drive timing of the panel driver 16 in accordance with the drive timing of the imaging device 14 to synchronize the capturing of images by the imaging device 14 and the display of images (encoding pattern or diaphragm pattern) by the display panel 38.

The image signals output from the imaging device 14 are supplied to the camera driver 18 via the camera substrate 10. The camera driver 18 supplies the image signals to an external processor via the flexible printed wiring film 22. The processor processes the image signals. Processing of the image signals includes the distance measurement. The processor supplies drive signals according to the diaphragm pattern or encoding pattern to the camera driver 18 via the flexible printed wiring film 22. The camera driver 18 supplies the drive signals to the display panel 38 via the flexible printed wiring film 20. Details of the processor will be described below with reference to FIG. 3.

The IR filter 28 transmits light other than infrared light. The IR filter 28 prevents infrared light from being made incident on the imaging device 14.

The display panel 38 includes an array substrate 32, a liquid crystal layer 34, and a counter-substrate 36. The liquid crystal layer 34 is arranged between the counter-substrate 36 and the array substrate 32. The counter-substrate 36 is arranged under the liquid crystal layer 34. A black matrix, an overcoat layer, an alignment film, and the like are formed on the counter-substrate 36. Since the display panel 38 is arranged to control the transmission of visible light or to control the pattern of encoding apertures, the counter-substrate 36 is not provided with a color filter. The counter-substrate 36 may include a multilayer substrate. The array substrate 32 is arranged above the liquid crystal layer 34. Common electrodes, pixel electrodes, alignment films, active devices, and the like are formed on the array substrate 32. An example of an active element is a thin-film transistor (TFT). The array substrate 32 may include a multilayer substrate.

The flexible printed wiring film 20 is electrically connected to either the array substrate 32 or the counter-substrate 36. In one example, the flexible printed wiring film 20 is connected to the surface of the array substrate 32 on the liquid crystal layer 34 side. A gap between the light shielding plate 42 and the array substrate 32 can be reduced by this configuration. The array substrate 32 is larger in size than the counter-substrate 36 since the array substrate 32 needs a contact area with the flexible printed wiring film 20.

The flexible printed wiring film 20 may be connected to the surface of the array substrate 32 on the light shielding plate 42 side.

Furthermore, the flexible printed wiring film 20 may be connected to the surface of the counter-substrate 36. In this case, the counter-substrate 36 is larger in size than the array substrate 32 since the counter-substrate 36 requires a contact area for the flexible printed wiring film 20.

The panel driver 16 generates a first voltage signal, a second voltage signal, and a control signal. The panel driver 16 supplies the first voltage signal to a pixel electrode of the display panel 38 via the active device. The panel driver 16 supplies the second voltage signal to a common electrode of the display panel 38. The panel driver 16 supplies the control signal to a control terminal of the active device. The control signal corresponds to the image to be displayed (encoding pattern or diaphragm pattern). The active device becomes conductive/non-conductive in accordance with the pixels of the image to be displayed. A voltage applied between the pixel electrode and the common electrode varies for each pixel. A transmittance of the liquid crystal layer 34 varies for each pixel. The display panel 38 thereby displays images.

The light shielding plate 42 is arranged on the array substrate 32. The light shielding plate 42 includes an aperture in the center. Light made incident on the light shielding plate 42 through a lens 48 passes through the aperture and is made incident on the display panel 38. A portion of the light shielding plate 42 other than the aperture is a light shielding portion through which light is not transmitted. The light shielding plate 42 controls the intrusion of external light which is unnecessary for image capture and which travels from the lens 48 to the imaging device 14. Instead of providing the light shielding plate 42, the same light shielding pattern as that of the light shielding plate 42 may be printed on the array substrate 32 or the counter-substrate 36 such that the array substrate 32 or the counter-substrate 36 may serve as the light shielding plate 42.

The cover board 44 is arranged on the light shielding plate 42. The cover board 44 is a plate-shaped member which protects the components of the camera 60 other than the lens module 46, i.e., the display panel 38 and the camera module 12. Instead of providing the light shielding plate 42, a pattern of the same light shielding portion as the light shielding plate 42 may be printed on the cover board 44, and the cover board 44 may serve as the light shielding plate 42.

The lens module 46 is arranged on the cover board 44. The lens module 46 includes a housing 47, and a lens 48 and an actuator 50 that are arranged within the housing 47. The lens 48 may be composed of a single lens or a plurality of lenses. The actuator 50 is electrically connected to the camera driver 18 via a wire (not shown). The camera driver 18 determines the focusing state from the output signal of the imaging device 14, drives the actuator 50 such that the lens 48 becomes the focusing state, and moves the lens 48 in the optical axis direction. The camera driver 18 determines the focusing state, for example, based on a phase difference between output signals of two pixels.

FIG. 2 is an exploded perspective view illustrating an example of the camera 60. FIG. 2 omits the flexible printed wiring films 20 and 22, but shows contacts 20a and 22a of the camera substrate 10 to which the flexible printed wiring films 20 and 22 are connected.

FIG. 3 is a block diagram illustrating an electrical configuration of a distance measurement system including the camera 60. The camera 60 is connected to a processor 54. The processor 54 is connected to an encoding pattern memory 56. The encoding pattern memory 56 stores encoding pattern data representing an encoding pattern which overlaps with an image of an object. The encoding pattern is a pattern that blurs in accordance with the shift when the object is shifted from the focusing state.

The processor 54 supplies the drive signals corresponding to the encoding pattern data, to the camera driver 18. The camera driver 18 controls the drive timing of the panel driver 16 panel driver 16 in synchronization with the drive of the imaging device 14.

The image signals output from the imaging device 14 are input to the processor 54 via the camera driver 18. The display panel 38 displays the encoding pattern, and the imaging device 14 captures an image of the object with which the encoding pattern overlaps. The processor 54 comprises a number of blur correction kernels corresponding to the distance to the object. The processor 54 performs convolution operation of the blur correction kernels to the image signal for each pixel of the image of the object. The processor 54 detects the correction kernel from which a calculation result with the least blurring can be obtained and uses the distance corresponding to the correction kernel as the measurement result of the distance to the object. Incidentally, a plurality of measurement results can be obtained with only one image of the object on which one encoding pattern overlaps. In this case, the calculation result with the least blurring can be obtained from one correction kernel, by using two images of the object on which at least two different encoding patterns overlap.

The processor 54 displays a distance image representing the distance for each pixel on a display device 52. An example of the distance image is an image in which each pixel is represented by a color corresponding to the distance.

The processor 54 may not only display the distance information, but perform various controls using the distance information. For example, when a distance measurement system is applied to a self-propelled robot, the processor 54 controls the robot's running to avoid the object in accordance with the distance to the object.

Figure 4A:
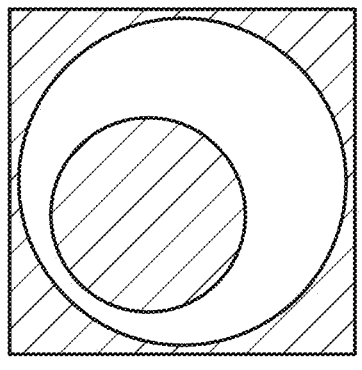
FIG. 4A is a view showing an example of an encoding pattern according to the first embodiment.
Figure 4B:
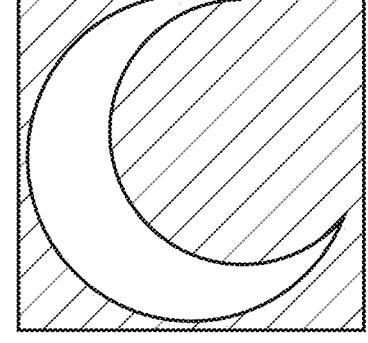
FIG. 4B is a view showing another example of the encoding pattern according to the first embodiment.

FIG. 4 is a view showing an example of the encoding pattern. The encoding pattern memory 56 stores an encoding pattern group including two different encoding patterns shown in FIG. 4A and FIG. 4B. The encoding patterns are determined such that the degree of blurring depends on the degree to which the object is shifted from the focusing state. Furthermore, the encoding patterns are determined such that the shape of the blurring is different when the object is in front of the focal position and when the object is behind the focal position. In other words, the encoding pattern needs to have no shape of a point object.

Two encoding patterns do not need to be used for distance measurement and, in some cases, the distance can also be measured with a single encoding pattern. Alternatively, the distance may be measured with three or more encoding patterns. The type of encoding patterns can be changed in accordance with the type of the object and the measurement environment. The encoding pattern memory 56 may store a plurality of encoding patterns or a plurality of encoding pattern groups, and the encoding pattern or encoding pattern group may be selected in accordance with the type of object or the measurement environment.

According to the first embodiment, the display panel 38 is arranged between the lens module 46 and the camera module 12. The display panel 38 displays the encoding pattern. The imaging device 14 captures an image of an object on which the encoding pattern overlaps. The processor 54 can obtain the distance to the object, based on this image. Since the display panel 38 displays the encoding pattern, the encoding pattern can easily be changed in accordance with the type of the object. The optimum encoding pattern for the object is used. For this reason, the distance can be obtained accurately for any object.

Since the display panel 38 is arranged between the lens module 46 and the camera module 12, incidence of light to the lens module 46 is not prevented. If the display panel 38 is arranged in front of the lens module 46 (on the object side or the upper side in FIG. 1), the display panel 38 prevents the light made incident on the lens module 46. When the lens module 46 includes lenses which condense light over a wide range, the size of display panel 38 needs to be larger than the diameter of the lens 48. The lenses which condense light over a wide range are lenses having a large size, a large curvature, or a combination of these characteristics. Examples of these lenses are fisheye lenses, wide angle lenses, and large-diameter lenses. The large-size display panel 38 has a low yield and manufactured at a high cost, and the number of panels that can be taken from a single wafer is small. Furthermore, in the large-size display panel 38, the number of spacers to be installed between the array substrate 32 and the counter-substrate 36 is increased. For this reason, light made incident on the lens module 46 interferes with the spacers, distorts the encoding pattern, and reduces the ranging accuracy. The display panel 38 arranged between the lens module 46 and the camera module 12 has substantially the same size as the lens module 46 and is manufactured at a low cost.

Furthermore, when the display panel 38 is arranged in front of the lens module 46, light made incident on the display panel 38 includes light made incident obliquely. When light is made incident on the lens after passing through the encoding aperture of the display panel 38, the encoding pattern is affected by lens distortion and is distorted at the periphery. For this reason, the distance cannot be measured accurately. According to the first embodiment, however, since most of the light made incident on the display panel 38 through the lens module 46 travels along the normal of the display panel 38, the encoding pattern in the periphery is hardly distorted. When the display panel 38 is arranged at the aperture diaphragm of the lens module 46, light made incident on the display panel 38 is only light traveling along the normal of the display panel 38, and the encoding pattern is not distorted. When the encoding pattern is located on the light incidence side of the lens module 46, the distance between the encoding pattern and the diaphragm in the lens module 46 may be larger, and the diaphragm may cause the encoding pattern to be missing. When the display panel 38 is arranged at the aperture diaphragm of the lens module 46, the encoding pattern can be imparted to the light passing through the lens without missing and, even if the display panel 38 and the imaging device 14 are slightly displaced, the accuracy of the distance to be measured is not reduced.

The processor 54 transmits the drive signals for the panel driver 16 and the drive signals for the camera driver 18, to the camera driver 18. The camera driver 18 supplies the drive signals to the panel driver 16 in synchronization with the image capture by the imaging device 14. Therefore, the display timing of the encoding pattern and the shooting timing of the imaging device 14 can be synchronized, and the distance can be detected correctly. Furthermore, the camera driver 18 is directly connected to the processor 54. The panel driver 16 is indirectly connected to the processor 54 via the camera driver 18. Therefore, a flexible printed wiring film connecting the processor 54 and the panel driver 16 is unnecessary.

Second Embodiment

Figure 5:
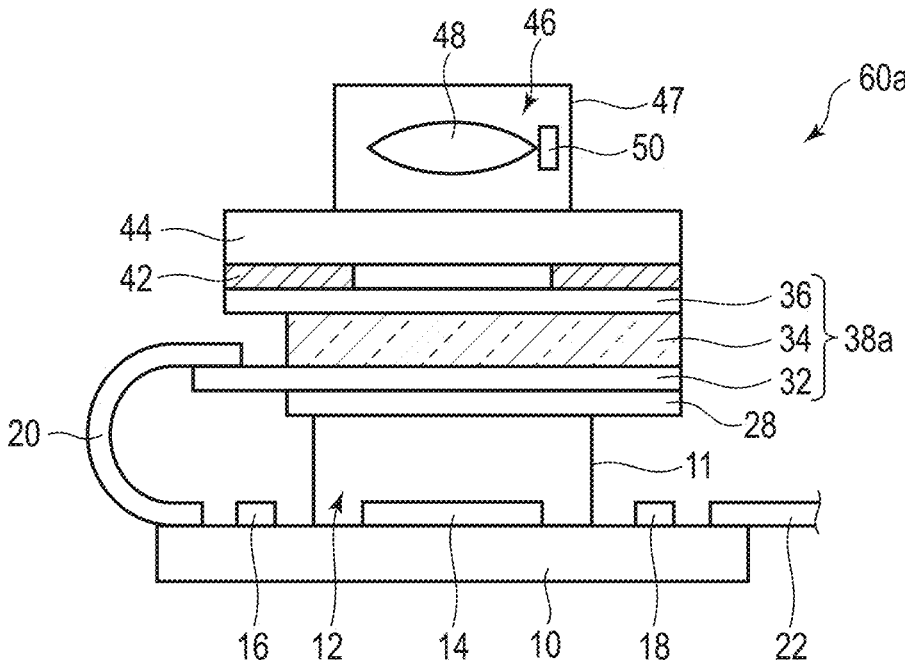
FIG. 5 is a cross-sectional view illustrating an example of a camera according to a second embodiment.

FIG. 5 is a view illustrating an example of a structure viewed from a side surface of a camera 60a according to a second embodiment. FIG. 6 is an exploded perspective view illustrating an example of the camera 60a according to the second embodiment.

The camera 60a comprises a display panel 38a instead of the display panel 38 of the first embodiment. The display panel 38a includes an array substrate 32, a liquid crystal layer 34, and a counter-substrate 36. The display panel 38a is different from the display panel 38 in order of arrangement of the array substrate 32, the liquid crystal layer 34, and the counter-substrate 36. In the display panel 38a, the array substrate 32 is arranged on the lower side of the liquid crystal layer 34. The counter-substrate 36 is arranged on the upper side of the liquid crystal layer 34.

The flexible printed wiring film 20 is connected to the surface of the array substrate 32 on the liquid crystal layer 34 side. The array substrate 32 is larger in size than the counter-substrate 36 since the array substrate 32 needs a contact area with the flexible printed wiring film 20.

The flexible printed wiring film 20 may be connected to the surface of the array substrate 32 on the IR filter 28 side.

Furthermore, the flexible printed wiring film 20 may be connected to the surface of the counter-substrate 36. In this case, the counter-substrate 36 is larger in size than the array substrate 32 since the counter-substrate 36 requires a contact area with the flexible printed wiring film 20.

The same advantages as those of the first embodiment can also be obtained in the second embodiment having such a configuration.

Third Embodiment

Figure 7:
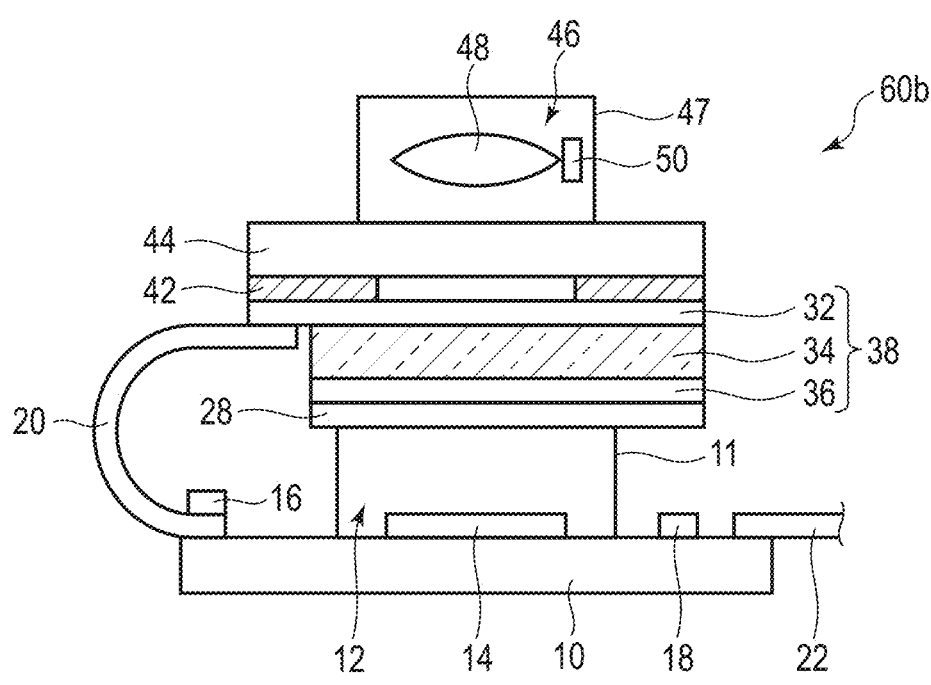
FIG. 7 is a cross-sectional view illustrating an example of a camera according to a third embodiment.

FIG. 7 is a view illustrating an example of a structure viewed from a side surface of a camera 60b according to a third embodiment.

The third embodiment relates to modification of the first embodiment. The camera 60b is different from the camera 60 in that a panel driver 16 is arranged on not a camera substrate 10, but a flexible printed wiring film 20. The third embodiment therefore achieves the same advantages as those of the first embodiment. Furthermore, according to the third embodiment, the flat size of the camera substrate 10 can be reduced since the installation space for the panel driver 16 is not required on the camera substrate 10. Not only the panel driver 16, but also the camera driver 18 may be arranged on the flexible printed wiring film 22.

Fourth Embodiment

Figure 8:
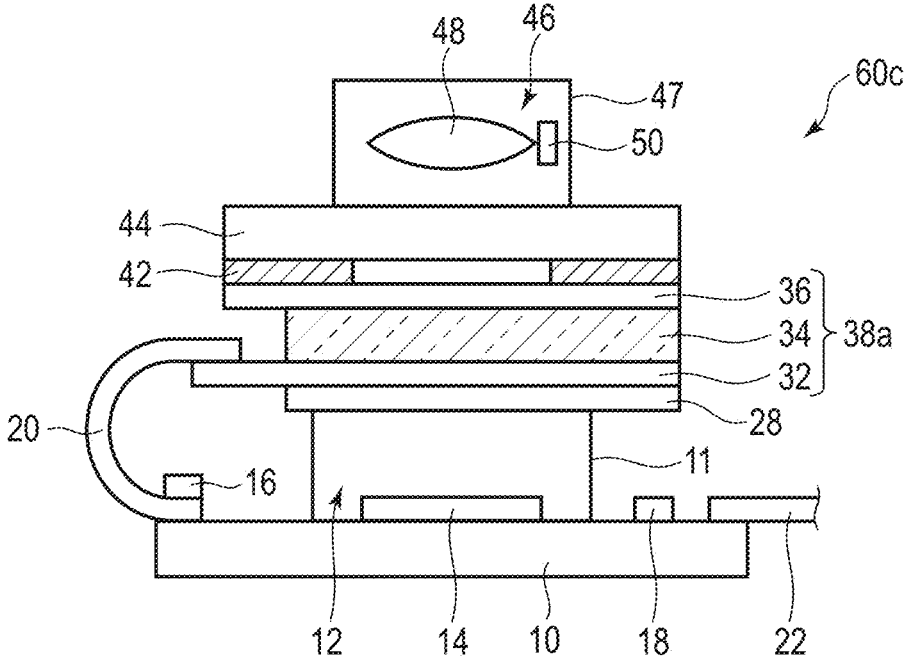
FIG. 8 is a cross-sectional view illustrating an example of a camera according to a fourth embodiment.

FIG. 8 is a view illustrating an example of a structure viewed from a side surface of a camera 60c according to a fourth embodiment.

The fourth embodiment relates to modification of the second embodiment. The camera 60c is different from the camera 60 in that a panel driver 16 is arranged on not a camera substrate 10, but a flexible printed wiring film 20. The fourth embodiment therefore achieves the same advantages as those of the second embodiment. Furthermore, according to the fourth embodiment, the flat size of the camera substrate 10 can be reduced since the installation space for the panel driver 16 is not required on the camera substrate 10. Not only the panel driver 16, but also the camera driver 18 may be arranged on the flexible printed wiring film 22.

Fifth Embodiment

Figure 9:
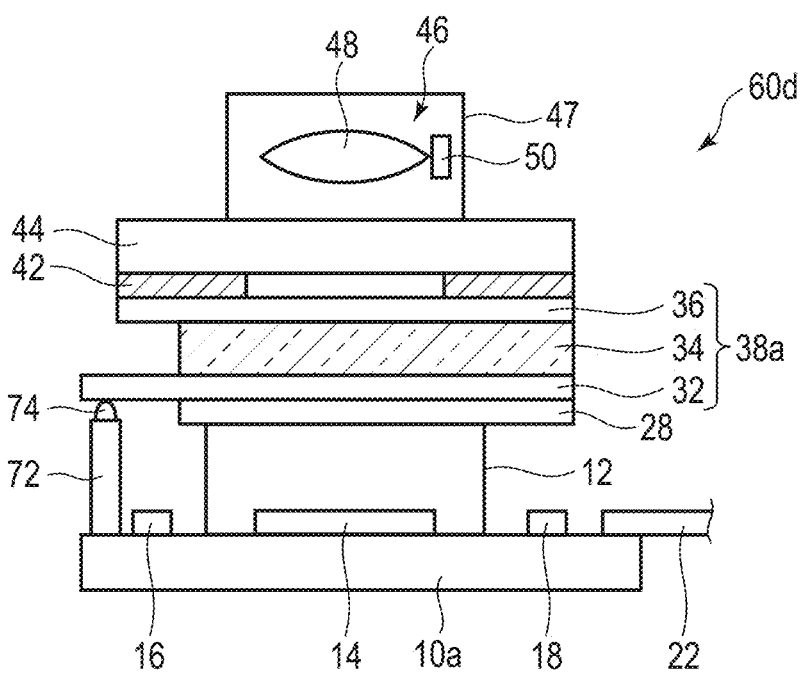
FIG. 9 is a cross-sectional view illustrating an example of a camera according to a fifth embodiment.

FIG. 9 is a view illustrating an example of a structure viewed from a side surface of a camera 60d according to a fifth embodiment.

The fifth embodiment relates to modification of the second embodiment. The camera 60d is different from the camera 60b in that solder balls 74 are used instead of a flexible printed wiring film 20 as components connecting a panel driver 16 with a display panel 38a. The solder balls 74 are arranged on a support portion 72 arranged in a two-dimensional array on a camera substrate 10a around a camera module 12. The support portion 72 includes wires inside and the solder balls 74 are electrically connected to the camera substrate 10 via the support portion 72. The camera substrate 10a is also referred to as a ball grid array (BGA) substrate.

In the first and fourth embodiments, the flexible printed wiring film 20 electrically connecting the camera substrate 10 with the array substrate 32 is curved from the camera substrate 10 and the array substrate 32 toward the surrounding. For this reason, the planar size of the cameras 60, 60a, 60b, and 60c is slightly larger than the camera substrate 10. In the fifth embodiment, the solder balls 74 electrically connecting the camera substrate 10a with the array substrate 32 are arranged directly under the array substrate 32. Therefore, the planar size of the camera 60d is not larger than the camera substrate 10A.

Sixth Embodiment

Figure 10:
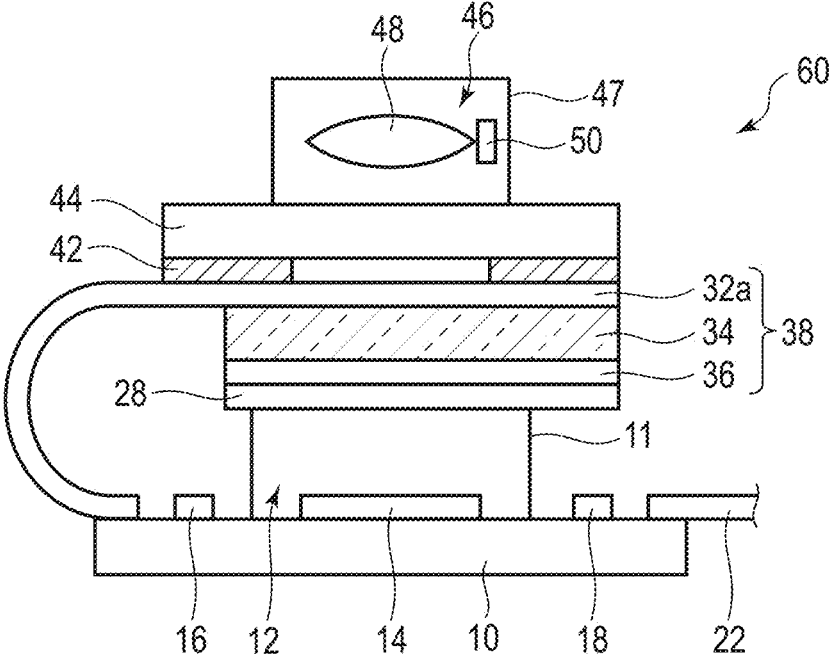
FIG. 10 is a cross-sectional view illustrating an example of a camera according to a sixth embodiment.

FIG. 10 is a view illustrating a cross-sectional structure of an example of a camera according to the sixth embodiment.

In the sixth embodiment, the array substrate 32 of the first embodiment is replaced with an array substrate 32a composed of a flexible printed wiring film. One end of the array substrate 32a is electrically connected to the camera substrate 10.

The sixth embodiment achieves the same advantages as those of the first embodiment. Furthermore, according to the sixth embodiment, the array substrate and the flexible printed wiring film are configured as a single unit, and the contact area of the array substrate and the flexible printed wiring film is unnecessary. For this reason, the planar size of the display panel 38 can be made smaller than that in the first embodiment, and the process of connecting the array substrate with the flexible printed wiring film is unnecessary. Moreover, the connection between the array substrate and the flexible printed wiring film is not unstable.

In the sixth embodiment, the panel driver 16 may be arranged on the array substrate 32*a*, similarly to the third embodiment.

In the sixth embodiment, not the array substrate 32, but the counter-substrate 36 may be constituted by a flexible printed wiring film, similarly to a modified example of the first embodiment.

Seventh Embodiment

FIG. 11 is a view illustrating a cross-sectional structure of an example of a camera according to the seventh embodiment.

In the seventh embodiment, the array substrate 32 of the second embodiment is replaced with an array substrate 32*a* composed of a flexible printed wiring film. One end of the array substrate 32*a* is electrically connected to the camera substrate 10.

The seventh embodiment achieves the same advantages as those of the second embodiment. Furthermore, according to the seventh embodiment, the contact area of the array substrate and the flexible printed wiring film is unnecessary. For this reason, the planar size of the display panel 38 can be made smaller than that in the first embodiment, and the process of connecting the array substrate with the flexible printed wiring film is unnecessary. Moreover, the connection between the array substrate and the flexible printed wiring film is not unstable.

In the seventh embodiment, the panel driver 16 may be arranged on the flexible printed wiring film 32*a*, similarly to the fourth embodiment.

In the seventh embodiment, not the array substrate 32, but the counter-substrate 36 may be constituted by a flexible printed wiring film, similarly to a modified example of the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera comprising:
a lens;
a liquid crystal display panel;
an imaging device on which light is made incident through the lens and the liquid crystal display panel;
a first driver configured to drive the imaging device to capture an image of an object;
a camera substrate on which the imaging device and the first driver are arranged; and
a second driver configured to drive the liquid crystal display panel to display a specific image, wherein
the liquid crystal display panel is between the lens and the imaging device,
the camera substrate is a ball grid array substrate comprising a plurality of solder balls arranged in an array state, and
the liquid crystal display panel is connected to the camera substrate via the plurality of solder balls.

2. The camera of claim 1, wherein
the liquid crystal display panel is arranged at a position of an aperture diaphragm of the lens.

3. The camera of claim 1, wherein
the first driver synchronizes displaying the specific image by the second driver with capturing an image of the object.

4. The camera of claim 1, wherein
the second driver is arranged on the camera substrate.

5. The camera of claim 1, wherein
the liquid crystal display panel comprises a first substrate, a second substrate, and a liquid crystal layer arranged between the first substrate and the second substrate,
the first substrate is a flexible printed wiring board comprising a plurality of active elements and a plurality of pixel electrodes, and
the first substrate is connected to the camera substrate.

6. The camera of claim 1, further comprising:
a processor to which an image captured by the imaging device is input, wherein
the second driver displays at least two specific images on the liquid crystal display panel, and
the processor calculates a distance to the object, in accordance with a shape of blur of at least two images of the object with which the at least two specific images overlap, respectively.

* * * * *